Sept. 20, 1955 P. B. WEISZ 2,718,305
SEPARATION OF GEL PARTICLES
Filed June 26, 1952 2 Sheets-Sheet 1

INVENTOR
Paul B. Weisz
BY
Raymond W. Barclay
ATTORNEY

United States Patent Office 2,718,305
Patented Sept. 20, 1955

2,718,305

SEPARATION OF GEL PARTICLES

Paul B. Weisz, Pitman, N. J., assignor to Socony Mobil Oil Company, Inc., a corporation of New York Application June 26, 1952, Serial No. 295,789

9 Claims. (Cl. 209—172)

This invention relates to an improvement in the production of inorganic oxide gel spheroids and more particularly is concerned with a method for separating the finished spheroidal gel particles from a mixture of the same with fines, irregularly shaped small pieces of gel and/or spheroidal gel particles characterized by minute internal cracks resulting from breakage and/or fracture of a portion of the spheroidal particles during the course of manufacture.

In recent years, considerable interest has developed in the manufacture of inorganic oxide gels as spheres, primarily because of the advantages inherent in this type of physical form. A number of processes for making spheroidal gel particles have been described in the art, such as, for example, the method of Marisic set forth in U. S. Patent 2,384,946. Briefly, this method involves the preparation of a gelable inorganic oxide hydrosol characterized by a relatively short time of gelation. The hydrosol is admitted in the form of separate globules to a body of oil or other water-immiscible fluid in which the globules assume a spheroidal shape and set to a hydrogel. The spheroidal hydrogel particles so obtained may be washed, base-exchanged, heat treated, or otherwise processed to obtain the desired physical and chemical characteristics in the final product. The form of the particles is generally maintained substantially constant from a time prior to gelation until after the gel has been dried. During drying, the hydrogel spheres shrink considerably, usually to about one-tenth of their original volume. The extent of drying will depend on the use which it is desired to make of the product but, in any event, the drying is carried to a stage beyond that at which maximum shrinkage of the gel is obtained. The gel particles, after syneresis or shrinkage thereof has been completed, are substantially dry; that is, the gel possesses open pores free of liquid although it still contains a relatively small percentage of strongly adsorbed water which is evolved during the final drying and tempering operations carried out at substantially higher temperatures. Drying of the hydrogel particles is preferably accomplished with superheated steam in accordance with the process described in U. S. Patent 2,397,350. The dried gel particles containing approximately 10 per cent by weight of water are thereafter suitably tempered in a kiln at an elevated temperature, for example, of about 1300° F. The gel particles are then cooled and the fines and broken pieces of gel which have accumulated during the course of drying and tempering are separated from the desired spheroidal gel beads.

One of the difficulties encountered in the formation of the above-described spheroidal gel particles has been the large loss of particles due to fracture and breakage of the beads with resultant production of gel fines and irregularly shaped pieces of gel. Such breakage is caused primarily by shattering of the desired gel particles during the drying operation. This shattering apparently results from internal stresses which develop within the spheroidal particles as the liquid phase is removed. While various methods have been proposed for reducing the extent of gel breakage during the drying and tempering operations, some breakage is almost invariably encountered in commercial operation due either to the aforementioned internal stresses or to fracture and attrition of the dry gel beads upon physical contact with one another.

The gel particles making up the initially obtained commercial mixture of fines, irregularly shaped fragments, spheroids having minute internal cracks and perfect spheroids, that is spheroidal particles free of internal cracks or fractures—all have a substantially identical particle density, specific gravity, and porosity. Particle density, as utilized herein, represents the weight of a particle of porous gel including the weight of air in the pores per unit of volume occupied by the particle. The individual particles are further characterized by substantially identical chemical composition. The particles differ principally in size, shape, and the presence or absence of minute internal cracks. Gel fines and irregularly shaped pieces of gel are necessarily removed from the desired spheroidal gel particles before the latter can be employed for their intended purpose.

One method heretofore used for separating the finished spheroidal gel beads from a mixture of the same with broken beads has been to conduct the gel product to a screening unit of mesh size such that the gel fines and broken pieces of gel pass through the screen while the beads are retained on the screen. Such method in practice has been found to have several disadvantages. Thus, additional bead breakage occurs on the screen due to a grinding effect exerted on the whole beads by the fines and broken beads already present in the mixture undergoing separation. Considerable difficulties are also caused by screen plugging and fouling, which necessitates periodic brushing of the screen. Furthermore, special type screens are required for effecting the desired separation since conventional square mesh screens become fouled very quickly with beads which jam into the screen openings and are extremely difficult to dislodge even with frequent brushing.

The present invention, in one embodiment, is directed to a method for separating the finished dried perfect spheroidal gel particles from a mixture of the same with fines, irregularly shaped pieces of gel and spheroidal particles having minute internal cracks which result from fracture or breakage of the perfect spheroidal particles. The procedure described herein takes advantage of certain characteristics of the desired perfect gel beads, namely, their spheroidal shape and the ability of a liquid to penetrate into the pores of the gel. The method involves bringing the mixture to be separated into contact with a liquid, the density of which is slightly greater than the particle density of the porous gel particles free of said liquid but less than the density of the gel particles when filled with said liquid. Upon immersion of a mixture of perfect beads, broken beads, and beads having minute internal cracks in a liquid of the above-defined density characteristics, the gel particles making up said mixture initially float at or near the liquid surface. As the liquid enters the pores of the gel particles, the average density thereof rises. The time which will elapse before the average particle density is equal to the density of the liquid will depend on the rate of entry of liquid. This, in turn, will depend on the size and shape of the particles undergoing separation and on the extent of internal fracture thereof. Extremely small particles, such as fines require only a short time before that required fraction of the volume is filled with liquid which will make their average density just exceed the density of the liquid. Irregularly shaped gel fragments of particle size approaching and comparable to the perfect spheroidal beads require a somewhat long time. The desired spheroidal particles require the longest time for liquid filling of the pores. As the individual gel particles become filled with liquid, they sink in the liquid. Since, as pointed out hereinabove, the specific gravity, porosity and particle density characteristics of the gel particles are substantially identical, the time which the gel particles remain in contact with the liquid before sinking is directly related to the extent of internal fracture and to the particle size and shape of the gel pieces undergoing separation. Thus, when a mixture of beads, irregular fragments, and fines is contacted with liquid, the fragments and fines sink to the bottom first, and only after an elapse of additional time do the remaining spheroidal particles sink to the bottom of the liquid. In this way, it is possible to achieve a separation of spheroidal beads and irregularly shaped gel fragments by immersing the mixture in the liquid and by subsequently separating those particles which sink to the bottom within a predetermined interval of time. Likewise, it is possible to separate a mixture of perfect spheroidal particles and spheroidal particles having minute internal cracks since the latter particles will initially sink in the liquid and only after an additional elapse of time will the perfect spheroidal particles sink.

The liquid employed in the present process has a density greater than the gel particle density but a density less than said particles when the pores thereof are filled with said liquid. The rate of entry of liquid into the pores of the particle is determined by the viscosity and the surface tension of the liquid on one hand, and the porosity of the solid on the other hand. While the rate of entry is thus determined, the time of sinking of a particle is determined by the time it will take, with such given rate of entry, to reach the point at which a given fraction of the particle volume is filled with liquid. This given fraction depends on the relative densities of the particle and the liquid so that at that point the average density of the particle just exceeds the density of the liquid. There is an upper limit to the density of the liquid which may be used and this is equal to the real density of the material of which the particles consist. For example, while the particle density of a typical silica-alumina gel catalyst is approximately 1.3 g./cc., the real density is about 2.2 g./cc. Thus, a liquid having a density equal or greater than 2.2 g./cc. would not be feasible in effecting separation of such particles inasmuch as the particles, whenever filled to any degree, would never sink in such liquid. While the aforementioned properties determine the rate of entry of liquid into the gel pores, the relative time at which particles of various types will sink is not influenced to any great extent by the choice of liquid. Thus, by choosing the liquid, the absolute time scale at which, the first particles sink can be made long or short. However, the relative time intervals at which remaining particles will sink will behave according to the scale.

Liquids of single component or solvent solutions of various compounds may be employed in achieving the desired separation. Thus, organic liquids of the requisite density or solutions of metal salts or other compounds and blends of two or more liquids may be used. Thus, for gel particles, having a range of particle density between 1.0 and 1.7 grams per cubic centimeter, various organic or inorganic halides of high density mixed with an inert lower density liquid may be used. Representative high density liquids include ethylene tribromide, thionylbromide, silicon bromide, antimony trichloride, antimony pentachloride, difluorodibromoethanes, etc. These liquids may be diluted with lower density non-reactive miscible liquids such as hydrocarbons, esters, alcohols, aldehydes, ketones, and the like to yield a liquid of the requisite density, that is, slightly higher than the particle density of the gel particles to be separated. Since salt solutions may affect the ultimate catalytic properties of the gel, it is preferred, particularly where the gel is to be employed as a catalyst, to use an organic liquid separating medium. After separation of the perfect spheroidal gel particles from the fines, irregularly shaped fragments, and/or the spheroidal particles having minute internal cracks, the liquid occluded in the separated particles may be recovered in any convenient manner, as, for example, by washing with a solvent, centrifuging, volatilization, and similar methods. The liquid so recovered may be reused for effecting separation of additional gel mixtures.

The instant separation method may be carried out either as a batch process or as a continuous operation. A suitable continuous procedure is shown in the attached drawings wherein.

Figure 1:
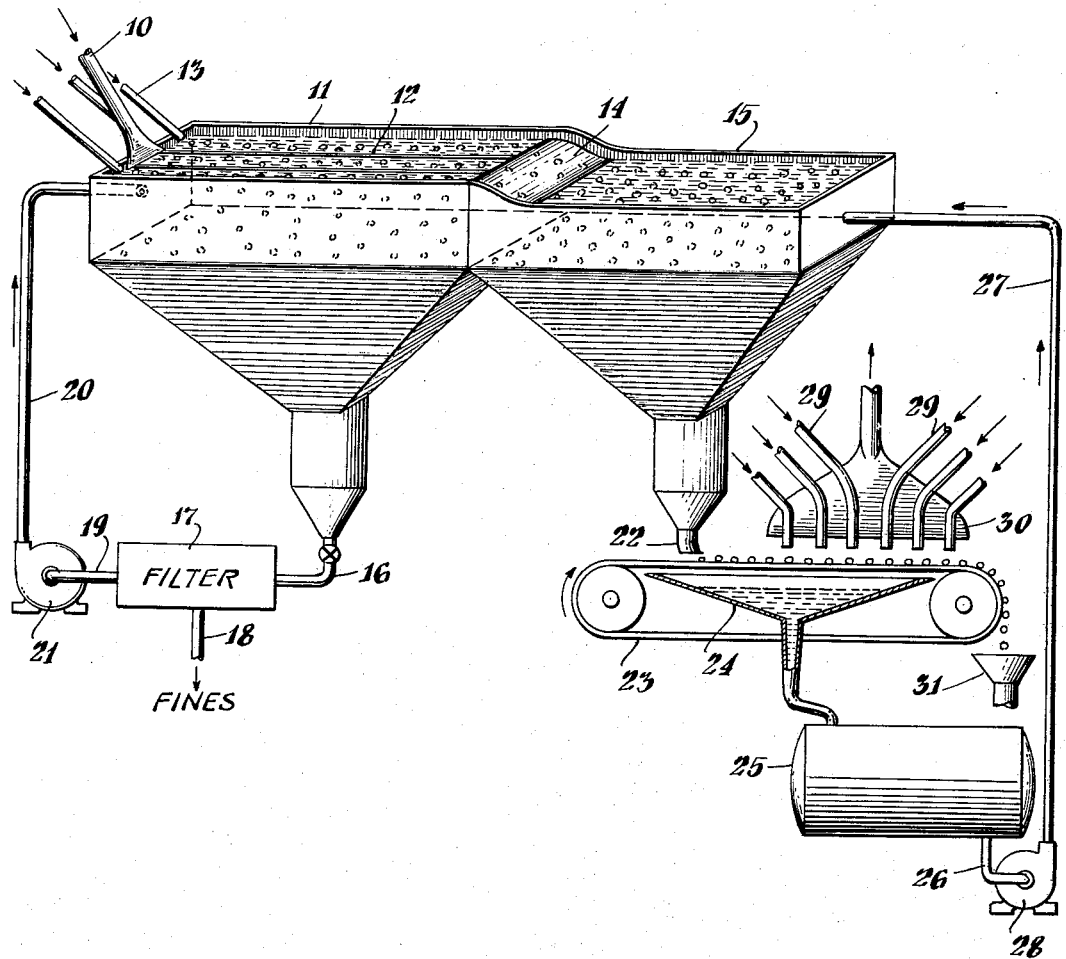
Figure 1 shows in partial diagrammatic form a feasible apparatus for accomplishing a continuous separation process employing principles of the invention.
Figure 2:
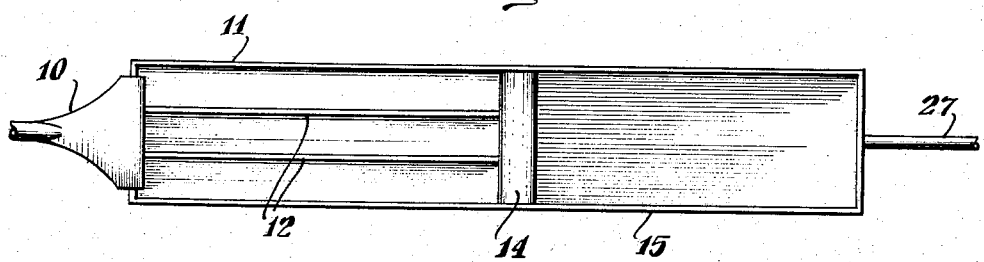
Figure 2 is a plan view of the tank section of the apparatus shown in Figure 1.

Referring particularly to the drawing, a mixture of whole, fractured, and broken gel beads is fed through conduit 10 and passes into tank 11 substantially filled with liquid of the requisite density as above described. Tank 11 is suitably longitudinally divided into a plurality of sections by strips 12. A portion of the mixture to be separated is fed into each of the sections. The gel particles float on the surface of the liquid in tank 11. Air or other inert gas is discharged through a plurality of conduits 13 overlying the surface of the liquid at the point of introduction of the gel mixture. One of such gas conduits overlies each of the aforementioned sections. The air or other gas so introduced serves to blow the gel particles along the surface of the liquid in tank 11. The rate at which the floating gel particles pass through the tank is correlated with the density of the liquid employed and the particle density of the gel such that during the course of passage of the mixture through the liquid, the fines and broken pieces of gel and nonperfect spheroidal particles become substantially filled with liquid and sink within tank 11 while the desired spheroidal particles of gel flow over separator 14 into an adjoining tank 15 and remain therein until such time that the pores thereof are substantially filled with liquid when they sink in tank 15. The liquid level in tank 15 is maintained somewhat lower than the level of liquid in tank 11 so that while the gel particles may readily pass from tank 11 to adjoining tank 15, flow in the opposite direction, that is, from tank 15 to tank 11, is impossible. Intermingling of the separated spheroidal particles in tank 15 with the mixture being fed into tank 11 is thereby eliminated.

The fines, irregular pieces of gel, and fractured spheroidal particles are separated in tank 11 flow downward through the lower conical section thereof and pass through outlet conduit 16. The gel material and liquid are separated in filter 17. The gel is removed through outlet 18 and may thereafter, if desired, be dried and processed in any desired manner. The removed liquid is withdrawn through pipe 19 and recycled through conduit 20 by means of pump 21 to tank 11. The rate of recycle of liquid is such as to maintain tank 11 substantially filled. The recycled stream of liquid may, of course, be supplemented by the introduction of additional liquid to tank 11.

The spheroidal gel particles separated in tank 15 flow downward through the lower conical section of this tank and pass through outlet conduit 22 onto an endless moving screenlike belt 23. The liquid passes through the belt into trough 24 and then is conducted into storage tank 25. The liquid is recycled from tank 25 through outlet conduit 26 and then through pipe 27 by means of pump 28 to tank 15. The rate of liquid recycle in this case also is such as to maintain tank 15 substantially filled. Additional liquid to accomplish this objective may also be separately added to tank 15. The spheroidal particles on belt 23 are dried by the introduction of warm gas through a plurality of conduits 29. The released vapors of the employed liquid are removed through hood 30 connected to a suitable exhaust means. The dried spheroidal particles are thereafter conducted from belt 23 and fall by gravity into chute 31 through which they are carried to storage facilities.

The same liquid is generally employed in tanks 11 and 15. However, in some instances, it may be desirable to use separate liquids in each of the two tanks, in which case a liquid of greater density will generally be used in tank 15 as compared with the liquid in tank 11. Since the spheroidal particles are carried over with liquid from tank 11, a second liquid in tank 15, when employed, will ordinarily be a blend of the initial liquid with another liquid of somewhat greater density to facilitate sinking of the separated spheroidal particles. It will be understood that the number of sections into which tank 11 is divided will depend on the size of said tank and the nature of the gel mixture being conducted thereto. It is accordingly contemplated that any convenient number of sections and air conduits placed thereover may be employed in achieving the objects of the invention.

The following examples will serve to illustrate the process of the invention without limiting the same:

*Example 1*

A silica-alumina hydrosol was prepared by mixing 1.00 volume of a solution of sodium silicate containing 157.0 grams of $SiO_2$ per liter with 1.00 volume of a solution containing 39.79 grams of aluminum sulfate and 30.51 grams of sulfuric acid per liter. The resulting colloidal solution was ejected from a nozzle in the form of globules into a column of oil, the depth of which was 8 feet. The globules of solution fell through the oil and gelled before passing into a layer of water located beneath the oil. The time of gelation for the concentrations and proportions of reactants given above was about 4 seconds. The spheroidal particles of gel were conducted out of the bottom of the column into a stream of water and on removal from the water, base-exchanged with an aqueous solution of aluminum sulfate and water-washed. The pellets were then slowly and uniformly dried in superheated steam at about 300° F. and thereafter calcined at about 1300 F. to yield particles having a size of between about 4 and about 20 mesh.

The resulting hard glassy spheroidal gel beads contaminated with gel fines, fractured beads, and irregularly shaped particles resulting from breakage of the perfect beads were characterized by a particle density of approximately 1.18 grams per cubic centimeter. The mixture of perfect beads, fractured beads, and fines together with irregularly shaped gel fragments was conducted to a vessel of carbon tetrachloride. All of the gel particles initially floated on the surface of the liquid. Within an interval of 1 to 5 seconds the gel fines were observed to sink in the liquid. After 5 seconds the spheroidal gel particles having minute internal cracks, that is, the fractured beads, were observed to sink. After 12 seconds the larger irregularly shaped pieces of gel of a size comparable to the beads were observed to sink. The spheroidal particles were the last to sink, remaining on the surface of the carbon tetrachloride for an average of 30 seconds before becoming filled with liquid and sinking.

It will be evident from the foregoing example that the procedure of this invention affords an effective means for selectively separating a mixture of whole, fractured, and broken spheroidal inorganic gel particles. It is to be noted that the gel particles undergoing separation have previously been subjected to identical drying conditions and that they are substantially identical with regard to water content, degree of hardness, porosity, specific gravity, and particle density. It is essential, for purposes of the present invention, that the mixture of gel particles undergoing separation be characterized by substantially identical porosity characteristics since the rate of liquid entry into the gel pores relied upon herein for separation is affected by the porosity and density of the gel particles. Should the mixture being separated by the present process comprise gel particles of varying degrees of porosity or particle density, it is apparent that the instant method for separating whole and broken gel beads would become unduly involved and cumbersome since whole beads having different porosities would themselves have different sinking densities upon contacting the same with a liquid as described above. Under such conditions, irregularly shaped broken gel beads and whole beads of somewhat greater porosity might very well have the same sinking densities and consequently be incapable of separation by this means. It is accordingly essential for successful operation of the instant process that the gel particles undergoing separation be characterized by a substantially identical porosity and particle density.

The method of the invention may be used for effecting separation of a mixture of gel spheroids and irregularly shaped gel fragments of smaller particle size or a mixture of gel spheroids and irregularly shaped gel fragments of substantially the same screen size. The rate of penetration of liquid through any part of the gel surface is the same throughout any shape or size of the particle. However, the fraction of the volume of the particle which is penetrated by the liquid in any given time depends on the ratio of the surface through which the liquid can penetrate to the volume of the particle. Since this surface to volume ratio is smallest for a perfect sphere, the time required for a given fraction of the particle volume to be penetrated by the liquid so that sinking thereof will occur is greatest. Any irregularity in shape makes the surface to volume ratio larger and therefore the time for a given fraction of the particle volume to be penetrated is that much shorter. The method described herein may also be used for separating a mixture of perfect spheroidal gel particles from spheroidal gel particles of substantially the same particle size having minute internal cracks. The presence of minute internal cracks or fractures within the particles essentially creates new surfaces of penetration into the particles. The method may also be used for effecting separation of a mixture of gel particles which has passed through a given screen size, including perfect spheroidal particles, fractured spheroidal particles, and irregularly shaped particles such as spheroidal halves. Upon immersion of such mixture in the specified liquid, the fractured spheroidal particles sink first. They are followed by the non-spheroidal particles and ultimately the desired spheroidal particles sink. The following example will serve to illustrate the separation of a mixture of this type.

*Example 2*

Figure 3:
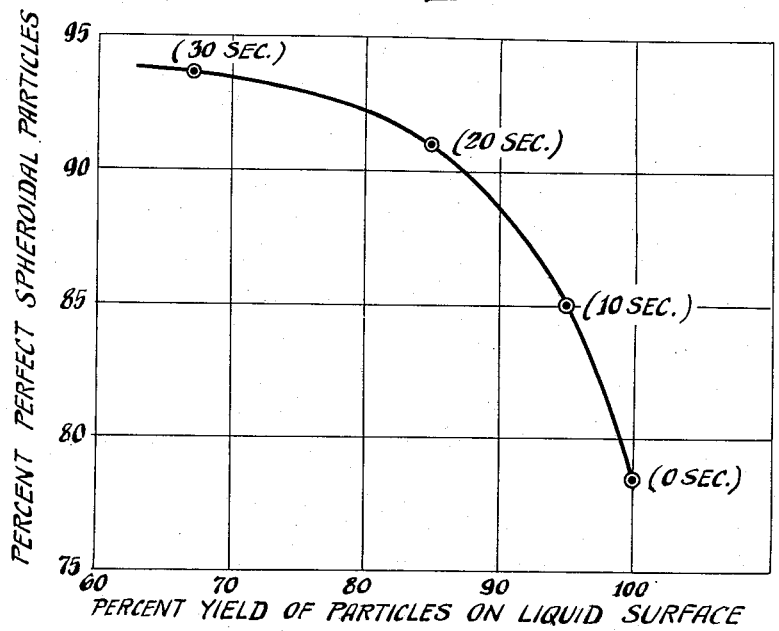
Figure 4:
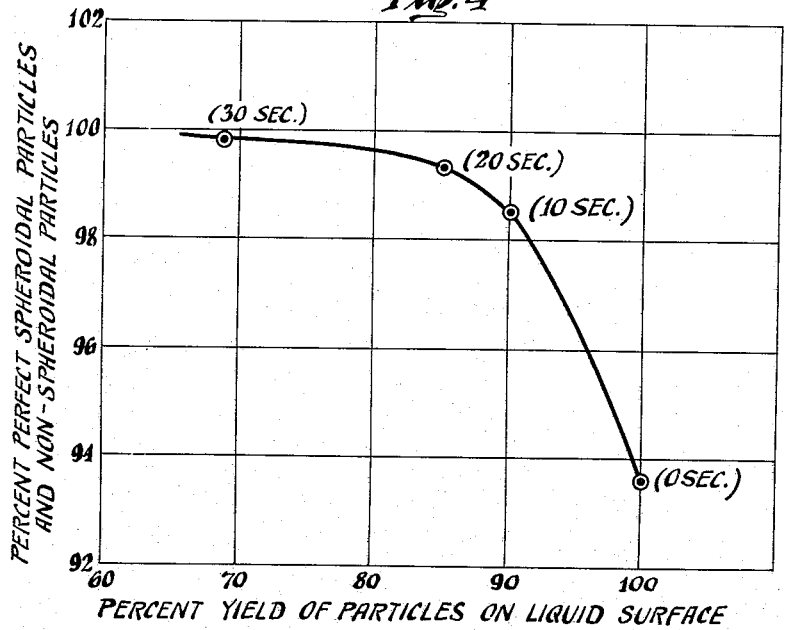

A mixture of silica-alumina gel particles, prepared as in Example 1, was screened to a size fraction of 5–6 mesh. The screened fraction, which contained perfect spheroidal and non-spheroidal particles as well as fractured spheroidal particles, that is, spheroidal particles having minute internal cracks, was immersed in carbon tetrachloride. The results obtained are shown graphically in Figures 3 and 4 of the attached drawing. Figure 3 indicates the selectivity of the method to perfect spheroidal particles remaining at the liquid surface at the specified elapsed times for 0 to 30 seconds, and the yield of product associated with it. In Figure 4, the results for the same experiment are plotted, in which, however, the selectivity of the method to perfect spheroidal and non-spheroidal particles, excluding fractured particles, is shown for the specified times. The great selectivity of the method to the rejection of fractured particles is seen by the better quality versus yield relationship of Figure 4. In general, the quality versus yield relationship improves with better preselection of size and, as will be noted from a comparison of Figures 3 and 4, by pre-elimination of non-spheroidal particles. Thus, the non-spheroidal particles may be separated by any feasible means, for example, by flowing the mixture down an incline plane so that particles with flat portions are retained on the plane while spheroids roll to a collecting means below. The resulting mixture of perfect and fractured spheroidal particles may then be effectively separated in accordance with the method described herein.

As will be realized from the above discussion, the spheroidal particles in contact with the liquid after removal of undesired particles will eventually become filled with liquid and sink. In some instances, it may be desirable to collect the separated spheroidal particles floating on the liquid before the same become saturated with liquid and sink. It is thus within the purview of the invention to collect the desired spheroidal gel particles in any feasible manner once the undesired gel particles and fragments have been removed therefrom by the instant separation method.

I claim:

1. A method for separating a mixture made up of spheroidal gel particles and irregularly shaped gel particles of size not larger than said spheroidal particles, which comprises bringing said mixture, all components of which are characterized by a substantially identical particle density, into contact with a body of liquid, the density of which is greater than said particle density but less than the density of the gel particles when the same are filled with said liquid, maintaining the mixture of gel particles in contact with the liquid until the irregularly shaped particles become filled with liquid and sink within said body of liquid and thereafter separating the spheroidal particles remaining at the surface of said liquid.

2. A method for separating a mixture of whole, fractured, and broken spheroidal bead-like gel particles, each of which is characterized by a substantially identical particle density, which comprises feeding said mixture to a body of liquid having a density greater than said particle density but less than the density of the gel particles when filled with said liquid, maintaining the mixture of gel particles in contact with the liquid until the density of the fractured and broken bead particles increases, due to the entry of liquid into the pores thereof, to a point greater than the density of said liquid, thereby causing said fractured and broken bead particles to sink in said body of liquid, collecting the remaining whole bead particles on the surface of said liquid and removing occluded liquid from the pores thereof.

3. A method for separating a mixture made up of gel spheroids and gel fragments of smaller particle size, which comprises conducting such mixture, all particles of which have a substantially identical particle density, into a body of liquid, the density of which is greater than said particle density but less than the density of the gel particles when the same are filled with said liquid, maintaining the mixture of gel particles in contact with the liquid until the fragments smaller than said spheroids become filled with liquid and sink within the body of liquid, leaving the spheroids remaining on the surface thereof, collecting said remaining spheroids and removing liquid therefrom.

4. A method for separating a mixture of spheroidal gel particles, a portion of which contain minute internal cracks, which comprises conducting said mixture, all particles of which have a substantially identical particle size and particle density, into a body of liquid, the density of which is greater than said particle density but less than the density of the gel particles when the same are filled with said liquid, maintaining the mixture of gel particles in contact with the liquid until the density of the particles havng minute internal cracks increases due to the entry of liquid therein to a point greater than the density of said liquid, thereby causing said particles to sink in said body of liquid and thereafter removing remaining spheroidal gel particles from the surface of said liquid.

5. A method for separating a mixture of spheroidal gel particles and non-spheroidal gel particles of substantially the same particle size, which comprises conducting said mixture, all particles of which have a substantially identical particle density, into a body of liquid having a density greater than said particle density but less than the density of the gel particles when the same are filled with said liquid, maintaining the mixture of gel particles in contact with the liquid until the non-spheroidal particles become filled with liquid and sink within the body of liquid, leaving the spheroidal particles remaining on the surface thereof and thereafter separating said spheroidal particles from said liquid.

6. A continuous process for separating a mixture of spheroidal gel particles and irregularly shaped gel particles of a size not larger than said spheroidal particles, which comprises continuously feeding said mixture, all components of which are characterized by a substantially identical particle density, to a body of liquid having a density greater than said particle density but less than the density of the gel particles when filled with said liquid, maintaining the mixture of gel particles in contact with the liquid until the density of the irregularly shaped particles exceeds the density of the liquid, causing the same to sink in said body of liquid, removing remaining spheroidal particles from the surface of said liquid body, removing liquid from the separated irregularly shaped particles and spheroidal particles and recycling said liquid for use in separation of additional mixture.

7. A continuous process for separating a mixture of spheroidal gel particles and irregularly shaped gel particles of a size not larger than said spheroidal particles, which comprises continuously feeding said mixture, all components of which are characterized by a substantially identical particle density, to a body of liquid having a density greater than said particle density but less than the density of the gel particles when filled with said liquid, continuously moving the mixture of gel particles along the surface of said liquid until the irregularly shaped particles become filled with liquid and sink within the liquid body, leaving spheroidal particles remaining on the surface thereof, continuously removing said spheroidal particles from said liquid surface, and drying the separated spheroidal particles to free the same of said liquid.

8. A continuous process for separating a mixture of whole, fractured, and broken spheroidal bead-like gel particles, each of which is characterized by a substantially identical particle density, which comprises feeding said mixture to a body of liquid having a density greater than said particle density but less than the density of the gel particles when filled with said liquid, continuously moving the mixture of gel particles along the surface of said liquid until the density of the fractured and broken bead particles increases, due to the entry of liquid into the pores thereof, to an extent greater than the density of said liquid, thereby causing said fractured and broken bead particles from said body in a liquid stream, filtering the fractured and broken bead particles from said stream, recycling said stream free of said particles to said body of liquid, collecting the whole bead particles from the surface of said liquid body, removing liquid from said whole bead particles, recycling a stream of the liquid so removed and subjecting the separated whole bead particles to a drying atmosphere.

9. A continuous process for separating a mixture of spheroidal gel particles, a portion of which contain minute internal cracks, which comprises continuously feeding said mixture, all components of which are characterized by substantially identical particle size and particle density, to a body of liquid having a density greater than said particle density but less than the density of the gel particles when filled with said liquid, maintaining the mixture of gel particles in contact with the liquid until the density of the particles having minute internal cracks exceeds the density of the liquid, thereby causing said particles to sink in said body of liquid, removing remaining spheroidal particles from the surface of said liquid body, removing liquid from the separated spheroidal particles and recycling said liquid for use in separation of additional mixture.

References Cited in the file of this patent

UNITED STATES PATENTS

| Number | Name | Date |
|---|---|---|
| 675,833 | Jones | June 4, 1901 |
| 1,807,817 | Anderson | June 2, 1931 |
| 2,241,737 | Romberg | May 13, 1947 |
| 2,451,528 | Armstrong | Oct. 19, 1948 |
| 2,483,372 | Payne | Sept. 27, 1949 |
| 2,508,867 | Rampino | May 23, 1950 |
| 2,643,215 | Hoge | June 23, 1953 |
| 2,688,401 | Schmitkons | Sept. 7, 1954 |